J. A. BOGART.

EXPANSION JOINT.

APPLICATION FILED MAY 20, 1920.

Reissued July 6, 1920.

14,906.

2 SHEETS—SHEET 1.

JOHN ALBERT BOGART
INVENTOR

BY John S. Powers
ATTORNEY

J. A. BOGART.

EXPANSION JOINT.

APPLICATION FILED MAY 20, 1920.

Reissued July 6, 1920. 14,906.

2 SHEETS—SHEET 2.

JOHN ALBERT BOGART
INVENTOR

BY John S. Powers
ATTORNEY

UNITED STATES PATENT OFFICE.

JOHN ALBERT BOGART, OF PORT CHESTER, NEW YORK, ASSIGNOR TO ALBERGER GAS ENGINE COMPANY, OF BUFFALO, NEW YORK, A CORPORATION OF NEW YORK.

EXPANSION-JOINT.

14,906. Specification of Reissued Letters Patent. Reissued July 6, 1920.

Original No. 1,319,457, dated October 21, 1919, Serial No. 48,805, filed September 3, 1915. Application for reissue filed May 20, 1920. Serial No. 382,992.

*To all whom it may concern:*

Be it known that I, JOHN ALBERT BOGART, a citizen of the United States, residing at Port Chester, in the county of Westchester and State of New York, have invented a new and useful Expansion-Joint, of which the following is a specification.

My invention relates to expansion joints for piping, such as steam-pipes, water-pipes, and the like, and is an improvement upon the common slip joint.

The object of my invention is to provide an expansion joint of the slip-joint type wherein, and among other things, these objects are attained, namely: support of the joint and the line piping; adjustability of packing without disassembling of parts; prevention of pulling apart of the slip-joint under conditions of extreme pipe contraction or improper assembling or adjustment of parts in setting up; the provision of a joint which may be adjusted readily in assembling, readily disassembled, repacked, etc., without any disturbance of the line piping. Other and further objects will be evident from the following specification and claims and from the annexed drawings, in which,—

Figure 1:
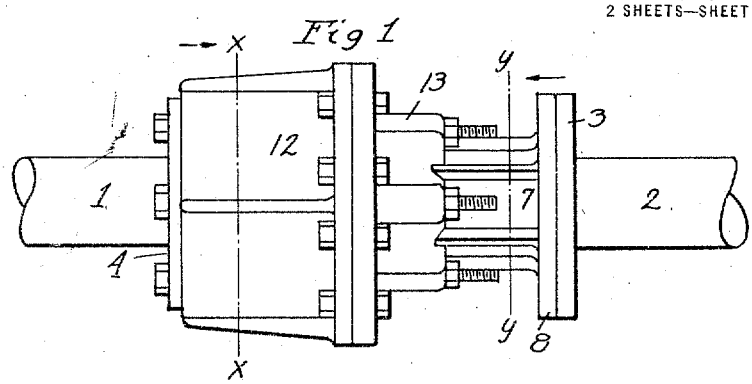
Figure 1 is a side elevation of my invention in assembled position.
Figure 2:
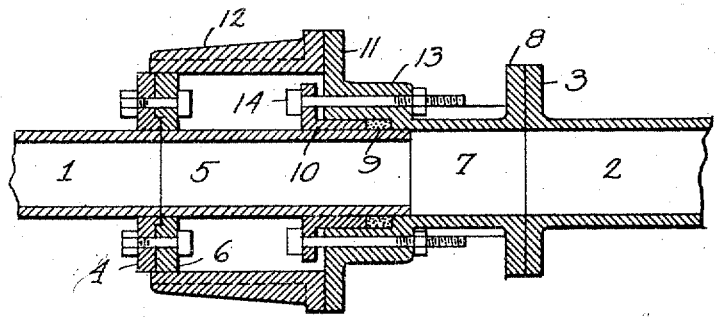
Fig. 2 is an axial section of Fig. 1.
Figure 3:
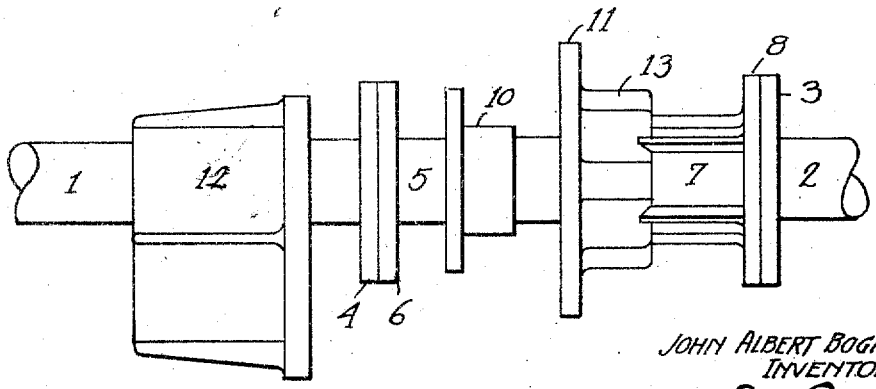
Fig. 3 is an elevation showing the parts disassembled for repacking or other purpose.

It is to be observed here that the stop device is omitted in Figs. 1, 2 and 3, because, first, the main, central feature of my invention may be employed without any stop means, and, second, because this form of illustration affords clearness.

The two adjacent sections of the line piping at the point where axial movement is to be taken care of are shown at 1 and 2, the section 1 being threaded or otherwise secured to or integral with the flange 4, and the section 2 being provided with an ordinary end-flange 3. A short section of piping 5, preferably of non-corrosive metal such as bronze, has threaded or otherwise secured to it a flange 6, which flange 6 is bolted to the flange 4 to form a fluid-tight joint. The pipe section 5 is machined on its outer surface and fits slidably within the main body 7 of the joint. This main body 7 has a flange 8 bolted fluid-tight to the flange 3, and at its other end is recessed to receive the packing 9 and gland 10.

The parts thus described, while in improved mechanical form, are approximately those of the ordinary slip-joint, and with these elements indicated which I employ in my new combinations, I will now indicate and describe my improvements.

The main body 7 has an extension flange 11. To this flange 11 is bolted a guide-sleeve 12, which is machined internally and which extends over and makes a good sliding joint with the flanges 4 and 6, one or both of which are machined upon their peripheries. This addition and improvement constitutes the first and main feature of my invention; and it will now be seen that this guide-sleeve 12, rigidly secured to the main body member 7 and fitting snugly but slidably over the flanges 4 and 6, provides a guide and support which prevents sagging of the pipe line or strain upon or displacement of the packing joint—objectionable conditions which have rendered the ordinary slip-joint undesirable, and the removal of which renders the slip-joint type of compensation the most desirable type. Moreover, by reference to Fig. 3 especially, it will be seen that my improvement above described not only meets these objections, but affords means of assembling, disassembling and repacking without any disturbance of the pipe line itself.

Coming now to the second main feature of my invention, since the guide-sleeve 12, except for the improvement now stated, would, if made of imperforate construction as shown and preferred, so inclose the gland-bolts that the guide-sleeve would have to be removed to adjust the gland, and since such removal not only would make the adjustment more laborious but would necessitate such adjustment at the time when the support of the guide-sleeve was removed, so that the adjustment might occur with the parts out of perfect alinement, I provide the main body 7 with the offsets 13, which are bored to receive the gland-bolts 14, which have their nuts abutting these offsets, and thus outside the guide-sleeve, so that the packing may be adjusted by the gland at any time without removal of the guide-sleeve and while the parts are held by the guide-sleeve in perfect alinement.

Figure 4:
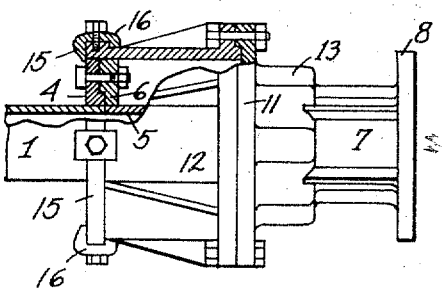
Fig. 4 is an elevation, partly in section, showing my means for prevention of pulling apart.
Figure 5:
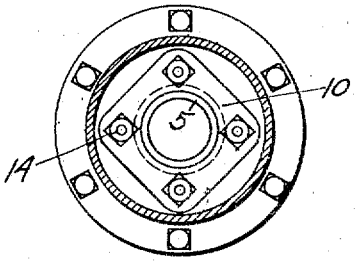
Fig. 5 is a section on $x$—$x$ of Fig. 1.
Figure 6:
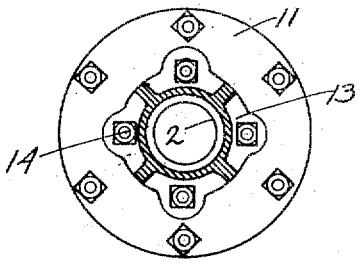
Fig. 6 is a section on $y$—$y$ of Fig. 1.

The third main feature of my invention, as above indicated, consists of stop means for preventing pulling apart of the joint under conditions of undue contraction or improper setting-up; for with the ordinary type of slip-joint it is not uncommon to have the members pull apart and cause serious damage. In Figs. 4, 5 and 6 I have shown the preferable form of my improvement. The guide-sleeve 12 is provided with an outstanding flange 15 (or I may use outstanding lugs arranged about the periphery of the guide-sleeve), over which are placed stops 16 secured thereto by bolts and having their inwardly-extending, or L-shaped, ends across the path of the sliding joint between the guide-sleeve 12 and the flanges 4 and 6. In Fig. 4 I have shown this feature with the parts in the position when the limit of pipe contraction permissible at the joint has been reached, and further movement at this point prevented by the stops 16 contacting the flange 4.

Figure 7:
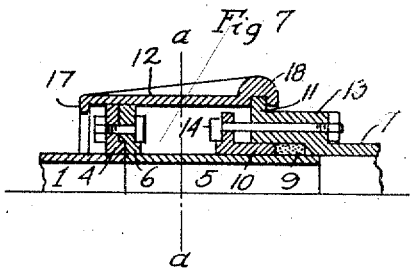
Fig. 7 is a half section detail showing a modified form of my means for prevention of pulling apart.
Figure 8:
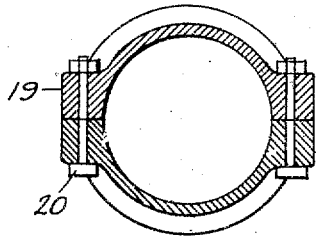
Fig. 8 is a cross-section on $a$—$a$ of Fig. 7, showing the two-part construction of the sleeve when the stop is constructed in the form of Fig. 7.

In Figs. 7 and 8 I have illustrated equivalent means for attaining this end which consist in casting the guide-sleeve 12 in two longitudinal parts, provided at its free end with an inwardly projecting flange 17, which crosses the path of the sliding joint between the guide-sleeve and the flanges 4 and 6, in a manner similar to the stops 16; and at the other end is provided with a grooved or rabbeted flange 18 which takes over the flange 11 on the main body 7, and is clamped thereto by means of side-lugs 19 and bolts 20. This construction attains the same ends as said first mentioned construction in Figs. 4, 5 and 6, and may likewise be removed without removal of the flanges 4 and 6.

Figure 9:
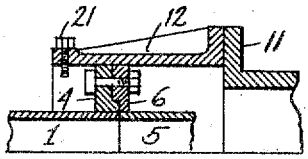
Fig. 9 is another half-section detail showing another form of stop construction.

Under some conditions this feature of my invention may be attained by the simple means shown in Fig. 9, wherein ordinary set-screws 21 are threaded through the guide-sleeve 12 and extend across the path of the joint between said sleeve and the flanges 4 and 6.

The fourth main feature of my invention arises from the combination and coöperative action of the improvements above described, whereby assembling, disassembling, repair, or adjustment are effected without disturbance of the line piping.

I do not wish to limit myself to the specific constructions shown and described, but claim:

1. In combination with two sections of a pipe line, a casing attached to the end of one pipe section, a tubular member on the end of the other pipe section and slidably disposed in said casing, an annular head on said tubular member, and a sleeve secured to said casing and extending over said head to form a protective chamber in which the sliding surface of said tubular member is disposed.

2. A device of the character described comprising a casing, a tubular member slidably mounted in said casing, and a sleeve secured to said casing and extending over the sliding surface of said tubular member to prevent the accumulation or discharge thereon of foreign material.

3. A device of the character described comprising a casing, a tubular member slidably mounted in said casing, an annular head on said tubular member, a sleeve secured to said casing and extending over such head to form a protective member in which the sliding surface of said tubular member is disposed, and stopping means formed on the free edge of said sleeve overhanging said head and extending into the path of movement of said head so that the outward movement of said tubular member is limited.

4. In combination with two sections of a pipe line, a casing attached to the end of one pipe section and recessed to receive packing and a packing gland and having holes to receive through-bolts for said gland, a tubular member on the other pipe section and slidably disposed in said casing, an annular head on said tubular member, a sleeve secured to said casing and extending over said head, packing and a packing gland in said casing, and gland-bolts engaging said gland and extending through said holes in said casing and adapted to the adjustment of said gland, whereby a closed chamber is formed to protect the joint and whereby said gland may be adjusted without disturbance or disassembling of said other parts.

5. An expansion joint comprising a main body secured to one side of the pipe line provided with a recess for packing and a gland, an extension flange to attach a cylindrical sleeve and offsets bored to receive gland-bolts, packing, gland-bolts and a gland, a slidable pipe section secured to the other side of said pipe line externally machined and sliding within said main body, and a cylindrical sleeve rigidly secured to said main body, internally machined and taking over the flange of said slidable pipe section to form a closed chamber and support for the joint so formed.

6. In combination with two sections of a pipe line, a casing attached to the end of one pipe section and recessed to receive packing and a packing gland and having holes to receive through-bolts for said gland, a tubular member on the other pipe section and slidably disposed in said casing, an annular head on said tubular member, a guide element secured to said casing and extending over and in encircling slidable engagement with said head, said guide element thereby providing support for the joint, packing and a packing gland in said casing, said gland lying within said guide element, and gland-bolts engaging said gland and extending through said holes in said casing, said bolts being thereby adapted to the adjustment of said gland externally of said casing and said guide element.

7. In combination with two sections of a pipe line, a casing attached to the end of one pipe section and recessed to receive packing and a packing gland and having holes to receive through-bolts for said gland, a tubular member on the other pipe section and slidably disposed in said casing, an annular head on said tubular member, a guide element secured to said casing and extending over and in encircling slidable engagement with said head, said guide element thereby providing support for the joint, packing and a packing gland in said casing, said gland lying within said guide element, gland-bolts engaging said gland and extending through said holes in said casing, said bolts being thereby adapted to the adjustment of said gland externally of said casing and said guide element, and means for limiting the outward movement of the casing and tubular member relatively to one another whereby the joint cannot be pulled apart.

8. A device of the character described comprising a casing, a tubular member slidably mounted in said casing, an annular head on said tubular member, an element secured to said casing and extending over and encircling said head to guide the same and provide support for the joint, and means associated with the guide element and coöperating with said head to limit the outward movement of the tubular member relatively to the casing whereby the joint cannot be pulled apart.

In witness whereof I affix my signature.

JOHN ALBERT BOGART.